United States Patent
Park (10) Patent No.: US 11,409,372 B1
(45) Date of Patent: Aug. 9, 2022

(54) APPARATUS FOR SUPPORTING A READING AND METHOD FOR DETECTING A USER INPUT USING THE SAME

(71) Applicant: WOONGJIN THINKBIG CO., LTD., Paju-si (KR)

(72) Inventor: Jeonguk Park, Paju-si (KR)

(73) Assignee: WOONGJIN THINKBIG CO., LTD., Paju-si (KR)

( * ) Notice: Subject to any disclaimer, the term of this patent is extended or adjusted under 35 U.S.C. 154(b) by 0 days.

(21) Appl. No.: 17/508,532

(22) Filed: Oct. 22, 2021

(30) Foreign Application Priority Data

Sep. 10, 2021 (KR) .................. 10-2021-0120718

(51) Int. Cl.
| | |
|---|---|
| G06F 3/01 | (2006.01) |
| G06F 3/0487 | (2013.01) |
| G06F 3/0485 | (2022.01) |
| G06V 40/20 | (2022.01) |
| G06F 3/04842 | (2022.01) |

(52) U.S. Cl.
CPC .............. *G06F 3/017* (2013.01); *G06F 3/011* (2013.01); *G06F 3/0485* (2013.01); *G06F 3/0487* (2013.01); *G06F 3/04842* (2013.01); *G06V 40/20* (2022.01); *G06F 2203/04803* (2013.01)

(58) Field of Classification Search
CPC .......... G06F 3/017; G06F 3/11; G06F 3/0482; G06F 3/0485; G06F 3/0487; G06F 2203/04803; G06V 40/20
See application file for complete search history.

(56) References Cited

U.S. PATENT DOCUMENTS

| | | | |
|---|---|---|---|
| 10,796,187 B1 | 10/2020 | Mei et al. | |
| 11,068,075 B1* | 7/2021 | Choi | .................. G06F 3/0304 |
| 11,068,076 B1* | 7/2021 | Choi | .................. G06F 3/0304 |
| 11,073,917 B1* | 7/2021 | Choi | .................. G09B 17/003 |
| 2009/0267893 A1* | 10/2009 | Kato | .................. G06F 3/03547 |
| | | | 348/143 |
| 2011/0304584 A1 | 12/2011 | Hwang | |

(Continued)

FOREIGN PATENT DOCUMENTS

| | | |
|---|---|---|
| JP | 2015-119430 A | 6/2015 |
| JP | 2020-201924 A | 6/2015 |

(Continued)

OTHER PUBLICATIONS

Fujishima, Noriaki, and Kiyoshi Hoshino. "Fingernail area extraction using distribution of colors." 2014 IEEE 3rd Global Conference on Consumer Electronics (GCCE). IEEE, 2014. (Year: 2014).*

(Continued)

*Primary Examiner* — Andrew T Chiusano
(74) *Attorney, Agent, or Firm* — Maschoff Brennan (57) ABSTRACT

Disclosed are a reading support apparatus which can detect a user input (touch and/or drag) conducted on a real book by using one camera, and a user input detection method using the same. The reading support apparatus detects a finger from a target surface image as a detection target. When the location of the detection target is not changed for a preset time, the reading support apparatus detects this condition as a touch input, and performs an action corresponding to the touch input.

13 Claims, 8 Drawing Sheets

(56) References Cited

U.S. PATENT DOCUMENTS

| | | | | |
|---|---|---|---|---|
| 2012/0042288 A1* | 2/2012 | Liao | ........................ | G06F 3/017 |
| | | | | 348/207.1 |
| 2012/0256824 A1* | 10/2012 | Mizunuma | ............. | G03B 17/54 |
| | | | | 345/156 |
| 2014/0079318 A1* | 3/2014 | Hasegawa | ............. | G06F 3/0425 |
| | | | | 382/165 |
| 2016/0224191 A1* | 8/2016 | Osamura | ............... | G06F 3/0425 |
| 2017/0031341 A1* | 2/2017 | Sugama | ............... | G05B 19/042 |

FOREIGN PATENT DOCUMENTS

| | | | |
|---|---|---|---|
| JP | 2021061984 A | * | 4/2021 |
| KR | 10-2010-0095987 A | | 9/2010 |
| KR | 10-1587471 B1 | | 1/2016 |

OTHER PUBLICATIONS

Wang, Yaming, Jiansheng Chen, and Guangda Su. "Efficient hand segmentation and fingertip detection using color features of skin and fingernail." IEICE Transactions on Information and Systems 96.8 (2013): 1894-1897. (Year: 2013).*

* cited by examiner

APPARATUS FOR SUPPORTING A READING AND METHOD FOR DETECTING A USER INPUT USING THE SAME

TECHNICAL FIELD

The present disclosure relates to a reading support apparatus for supporting a user's reading by providing additional contents related to a real book.

BACKGROUND ART

In general, reading refers to a behavior of acquiring knowledge by reading a book including letters and images. Recently, people have been accustomed to electronic devices such as a smart phone and tablet. Thus, more and more people acquire knowledge by watching video through the Internet or performing Internet surfing rather than reading a real book composed of only letters and images (i.e. still images).

In the publishing industry, various attempts have been made to replace real books with multimedia books each composed of letters, images, voices, sound effects and videos. However, the conventional multimedia book simply provides voices and images related to the contents of the book, or only provides necessary information in a passive or one-dimensional manner.

Thus, in the publishing industry, research is being conducted on various reading support technologies for inducing a user to actively read a book or to actively participate in reading.

The contents described in the above background art is to promote understanding of the background of the invention, and may contain matters which are not prior arts already known to a person skilled in the art to which the present technology pertains.

Related Art Document

Patent Document

Korean Patent No. 10-1587471

SUMMARY OF INVENTION

Technical Problem

The present disclosure is proposed to solve the above conventional problem, and an object of the present disclosure is to provide a reading support apparatus which can detect a user input (touch and/or drag) conducted on a real book by using one camera, and a user input detection method using the same.

Solution to Problem

To achieve the object, a reading support apparatus according to an exemplary embodiment of the present disclosure includes a memory configured to store instructions which, when executed, cause the reader terminal to perform operations; a processor configured to generate and output a capturing start request for staring a service, generate and output an image output request including a target surface image when the target surface image is inputted as a response to the capturing start request; and a display configured to output the target surface image generated in response to the image output request, wherein the processor further configured to: set the reading support apparatus to an input detection mode after outputting the image output request, and then generate and output an input detection start request, process an image, captured through one camera which captures an image of an area in which a real book is disposed in response to the capturing start request, into the target surface image, and detect a finger as a detection target from the target surface image in response to the input detection start request, and determine that a user touch is inputted, when the location of the detection target is not changed for a preset time.

To achieve the object, a user input detection method using a reading support apparatus according to an exemplary embodiment of the present disclosure includes outputting a capturing start request for starting a service; processing an image captured through one camera, which captures an image of the area where a real book is disposed in response to the capturing start request, into a target surface image; outputting an image output request including the target surface image; outputting the target surface image in response to the image output request; outputting an input detection start request to detect a user input, after outputting the image output request; and detecting a finger included in the target surface image as a detection target in response to the input detection start request, and detecting, as a touch input, a condition in which the location of the detection target is not changed for a preset time.

Advantageous Effects

According to the present disclosure, the reading support apparatus and the user input detection method may detect, as a user touch, touch and drag conducted on a real book by using a target surface image captured through one camera disposed obliquely above a target surface, thereby detecting a user input on the surface of the real book which cannot detect a user input such as touch and drag.

Furthermore, the reading support apparatus and the user input detection method may detect, as a user touch, touch and drag conducted on a real book by using a target surface image captured through one camera disposed obliquely above a target surface, thereby detecting a user input by using one camera embedded in a tablet or holder without adding a camera for detecting a user input. Thus, the reading support apparatus and the input detection method may prevent an additional cost increase, thereby minimizing a product cost and a user's financial burden.

Furthermore, the reading support apparatus and the user input detection method may detect, as a touch input, a condition in which the location of a finger included in the target surface image is not changed, thereby minimizing image analysis for touch input detection such that touch recognition can be rapidly performed.

Furthermore, the reading support apparatus and the user input detection method may detect a touch input by using the location of the finger included in the target surface image and the areas of skin around the nail. Thus, although a user puts the finger on the target surface to turn a page or places the finger on the target surface to perform another operation, the reading support apparatus and the user input detection method may not recognize this condition as a user input, thereby preventing an unintended touch input.

DESCRIPTION OF EMBODIMENTS

Hereinafter, the most preferred exemplary embodiments of the present disclosure will be described with reference to the accompanying drawings in order to specifically describe the exemplary embodiments such that those skilled in the art to which the present disclosure pertains may easily implement the technical spirit of the present disclosure. First, in adding reference numerals to the components of each drawing, it should be noted that the same components have the same reference numerals as much as possible even if they are illustrated in different drawings. Further, in describing the present disclosure, when it is determined that the detailed description of the related well-known configuration or function may obscure the gist of the present disclosure, the detailed description thereof will be omitted.

Those skilled in the art will appreciate that various exemplary blocks, devices or operations, which will be described in relation to components disclosed in this specification, can be implemented in electronic hardware, computer software or a combination thereof. Such blocks, devices or operations may be implemented or performed by using a processor, DSP (Digital Signal Processor), ASIC (Application-Specific Integrated Circuit), ASSP (Application-Specific Standard Product), FPGA (Field-Programmable Gate Array), another programmable logic device, an individual gate or transistor logic device, an individual hardware component or a random combination thereof, which is designed to construct a configuration disclosed in this specification. The processor may be implemented as a combination of computing devices, for example, a combination of a DSP and microprocessor, a plurality of microprocessors, one or more microprocessors connected to a DSP core, or another random component. The computer software or program may be present in a RAM (Random Access Memory), ROM (Read Only Memory), nonvolatile RAM such as flash RAM, EPROM (Erasable Programmable ROM), EEPROM (Electrically Erasable Programmable ROM), register, hard disk, removable disk, CD-ROM or another type of storage medium publicly-known to this technical field, and include machine readable commands which can be executed by an array of logic devices such as processors or DSPs. An exemplary storage medium may be coupled to a processor, and the processor may read information from the storage medium, and write information to the storage medium. As an alternative, the storage medium may be integrated with the processor. The processor and the storage medium may be located in an ASIC. The ASIC may be located in a user terminal. As an alternative, the processor and the storage medium may exist as individual components in a reading support apparatus.

Figure 1:
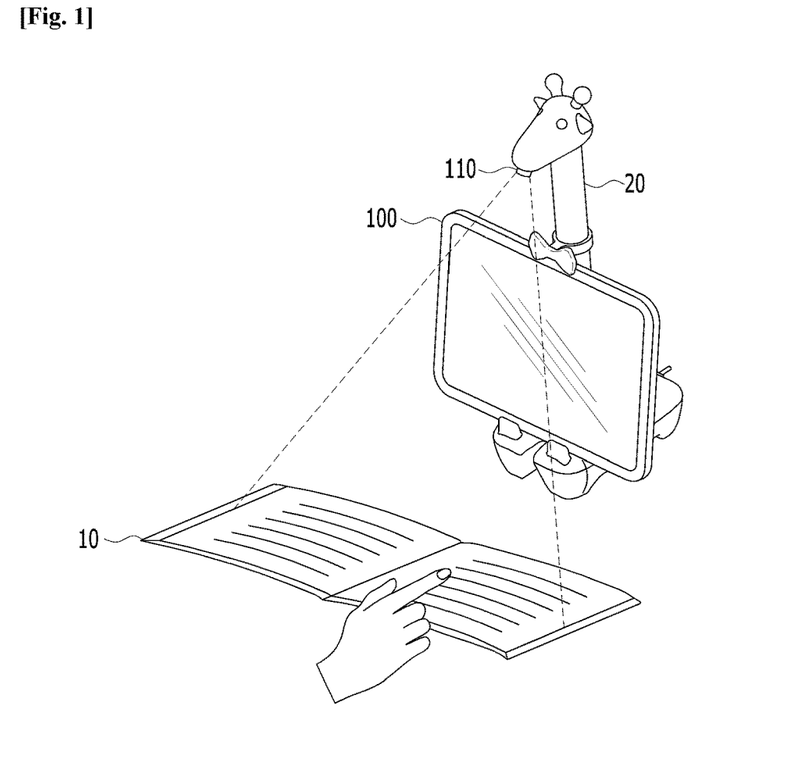
FIG. 1 is a diagram for describing a reading support apparatus in accordance with an embodiment of the present disclosure.

Referring to FIG. 1, a reading support apparatus 100 in accordance with an embodiment of the present disclosure detects, as a user input, a user's touch or drag which is performed on the surface of a real book 10, and provides an action corresponding to the user input.

The reading support apparatus 100 may detect a user input such as touch or drag, when using a plurality of cameras, a depth camera and the like. In this case, however, the increase in cost required for the cameras raises the cost of a product, thereby increasing the financial burden for a user.

When the reading support apparatus 100 is configured to include one camera disposed in parallel to a target surface on one side of the target surface, it is possible to prevent the increase in financial burden. In this case, however, the reading support apparatus 100 may neither detect user inputs other than touch nor capture an image of the target surface. Thus, the reading support apparatus 100 cannot perform an essential function of performing an action corresponding to a user input.

Furthermore, since the reading support apparatus 100 includes one camera 110 disposed obliquely above the target surface in order to capture an image of the target surface and the surface of the real book 10 has no function of detecting a user input such as touch or drag, the reading support apparatus 100 has difficulties in detecting a user input which is performed on the target surface (i.e. the surface of the real book 10).

Therefore, the reading support apparatus 100 in accordance with the embodiment of the present disclosure aims at detecting a user input such as touch or drag by using a target surface image TI captured through one camera 110 which is disposed obliquely above the target surface.

For this operation, the reading support apparatus 100 detects a touch input as a user input on the basis of the location of a finger included in an image captured with the finger placed on a target surface and/or whether the finger is at a standstill. When the finger moves on the target surface image TI immediately after the touch input was detected, the reading support apparatus 100 detects the movement as a drag input.

Through this operation, the reading support apparatus 100 in accordance with the embodiment of the present disclosure may detect touch or drag as a user input on the target surface with no user input detection function, by using one camera 110 disposed obliquely above the target surface, and perform an action corresponding to the user input.

Figure 2:
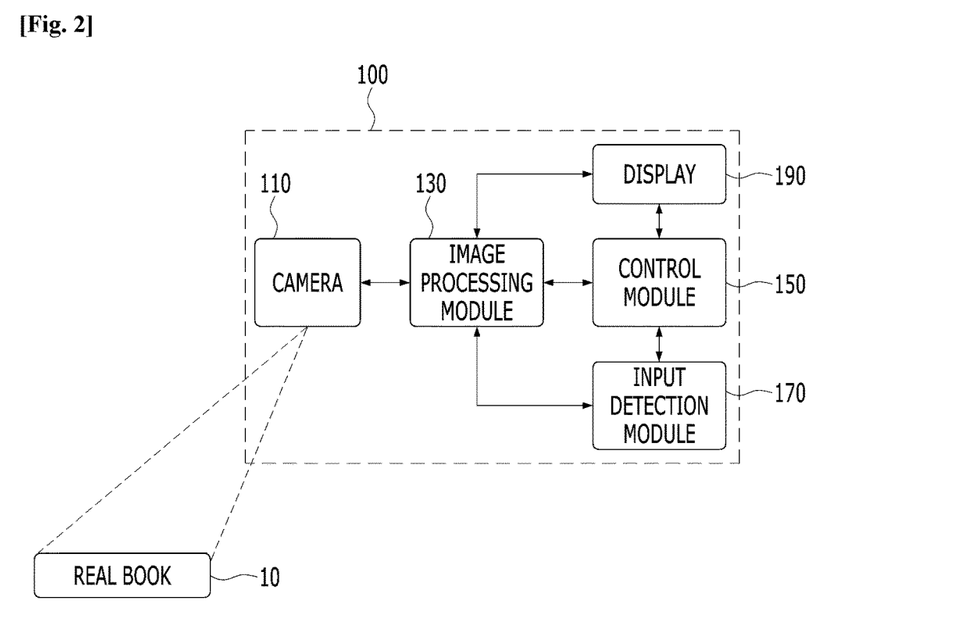
FIG. 2 is a diagram for describing a configuration of the reading support apparatus in accordance with the embodiment of the present disclosure.

Referring to FIG. 2, the reading support apparatus 100 in accordance with the embodiment of the present disclosure includes a camera 110, an image processing module 130, a control module 150, an input detection module 170 and a display 190.

As described in advance, the operations or configuration of the modules 130, 150 and 170 could be understood as operations or configuration of at least one of processor. The processor may perform the operations by executing instructions in a computer program stored in a memory device. However, in the followings, the exemplary embodiments will be described using modules for a convenience of explanation.

The control module 150 generates a capturing start request when the reading support apparatus 100 is driven by a user. The control module 150 transmits the capturing start request to the camera 110 and the image processing module 130.

The camera 110 captures an image of the area where the real book 10 is disposed, in response to the capturing start request of the control module 150. The camera 110 transmits the captured image to the image processing module 130. FIG. 1 illustrates that the image of the area where the real book 10 is disposed is captured through one camera 110 mounted on a holder 20 having the reading support apparatus 100 held thereon. However, the present disclosure is not limited thereto, but the image of the area where the real book 10 is disposed may be captured through one camera 110 embedded in the reading support apparatus 100.

The image processing module 130 generates the target surface image TI in response to the capturing start request of the control module 150. The image processing module 130 processes the image received from the camera 110 into the target surface image TI, and transmits the target surface image TI to the control module 150. The target surface image TI indicates an image obtained by photographing a surface of the real book 10 or the surface on which the real book 10 is disposed.

The control module 150 receives, as a response to the capturing start request, the target surface image TI from the image processing module 130. The control module 150 generates an image output request including the target surface image TI. The control module 150 transmits the image output request to the display 190.

Figure 3:
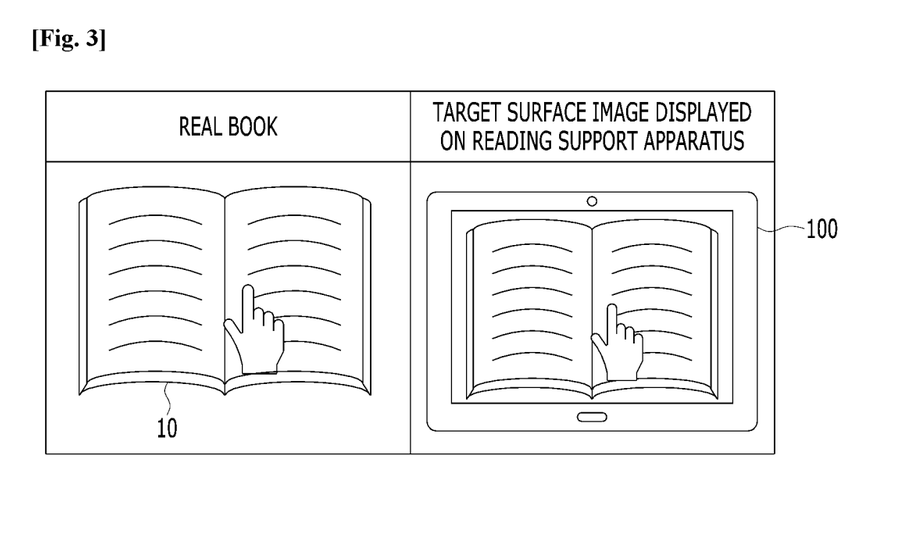
FIG. 3 is a diagram for describing a target surface image outputted by a display of FIG. 2.

Referring to FIG. 3, the display 190 outputs the target surface image TI onto a screen in response to the image output request of the control module 150. At this time, the display 190 outputs the target surface image TI including the real book 10 onto the screen.

The control module 150 sets the reading support apparatus 100 to an input detection mode after transmitting the capturing start request. As the reading support apparatus 100 is set to the input detection mode, the control module 150 generates an input detection start request, and transmits the input detection start request to the input detection module 170.

The input detection module 170 detects a user input in response to the input detection start request of the control module 150. The input detection module 170 detects a touch input and drag input as a user input, based on whether the location of the finger included in the target surface image TI generated by the image processing module 130 is changed.

When the state in which the finger is at a standstill on the target surface image TI is maintained for a preset time or more, the input detection module 170 detects this condition as a touch input. That is, the input detection module 170 tracks the finger on the target surface image TI. When the location of the finger is not moved for the preset time, the input detection module 170 detects this condition as a touch input.

Figure 4:
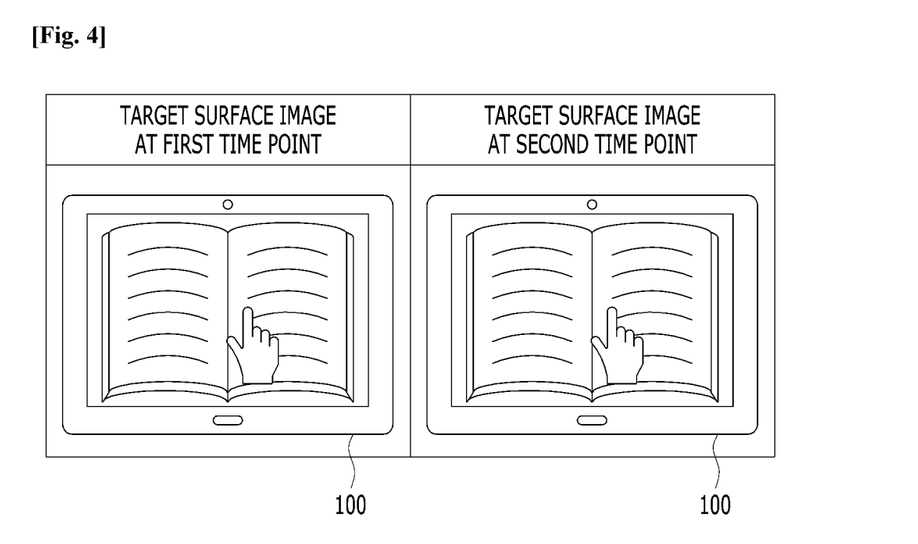
FIG. 4 is a diagram for describing an example in which an input detection module of FIG. 2 detects a touch input.

For example, referring to FIG. 4, the location of the finger on the target surface image TI may not be moved during a time period from a first time point T1 to a second time point T2. In this case, the input detection module 170 detects this condition as a touch input. At this time, the second time point T2 corresponds to the point of time that a preset time has elapsed from the first time point T1.

The input detection module 170 detects a touch input from an area where a text and/or image is disposed in the entire area of the target surface image TI. That is, since the reading support apparatus 100 performs an action such as video playback or vocabulary dictionary output, related to a text or image of the real book 10, the input detection module 170 detects a touch input from the area where the text and/or image is disposed in the entire area of the target surface image TI.

When the input detection module 170 detects a touch input only with a change in location of the finger, a user's action of putting a finger on the target surface so as to turn a page or placing a finger on the target surface to perform another operation may be recognized as a touch.

Furthermore, since the target surface image TI is an image captured through one camera 110 disposed obliquely above the target surface, the area of skin on the left of the nail and the area of skin on the right of the nail may be equal to or different from each other, depending on the relative location of the finger (e.g. the location of the finger on the real book 10 or the location of the finger on the target surface image TI).

Thus, the input detection module 170 may detect a touch input by using the location of the finger included in the target surface image TI and the area of skin around the nail. When the state in which the finger is at a standstill on the target surface image TI is maintained for the preset time or more as described above, the input detection module 170 primarily detects this condition as a touch input.

The input detection module 170 primarily detects the touch input, and then detects the location of the finger included in the target surface image TI. At this time, the input detection module 170 divides the target surface image TI into a plurality of zones, and detects a zone including the location of the finger.

Figure 5:
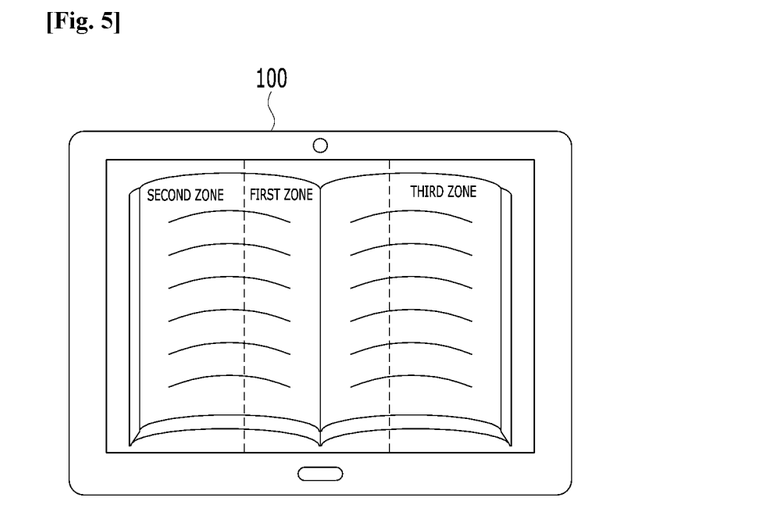
FIGS. 5 to 8 are diagrams for describing a modified example in which the input detection module of FIG. 2 detects a touch input.

For example, referring to FIG. 5, the input detection module 170 divides the target surface image TI into a first zone, a second zone disposed on the left of the first zone, and a third zone disposed on the right of the first zone, and detects one zone including the location of the finger.

The input detection module 170 detects the area of skin on the left of the nail and the area of skin on the right of the nail on the target surface image TI. The input detection module 170 compares the area of skin on the left of the nail to the area of skin on the right of the nail, and detects a final touch input by using the detected zone of the area comparison result.

Figure 6:
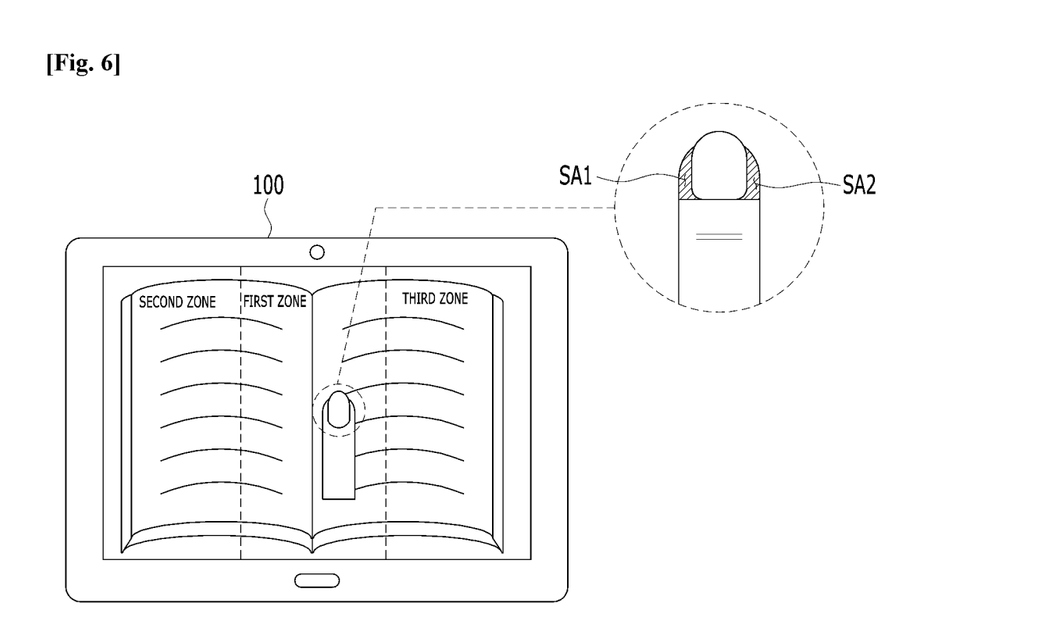

For example, when the first zone is detected on the basis of the finger location as illustrated in FIG. 6, the input detection module 170 detects a first area SA1 indicating the area of skin located on the left of the nail and a second area SA2 indicating the area of skin located on the right of the nail, in the finger on the target surface image TI. The input detection module 170 compares the first area SA1 and the second area SA2. When the first and second areas SA1 and SA2 are equal to each other within an error range, the input detection module 170 detects this condition as a touch input.

Figure 7:
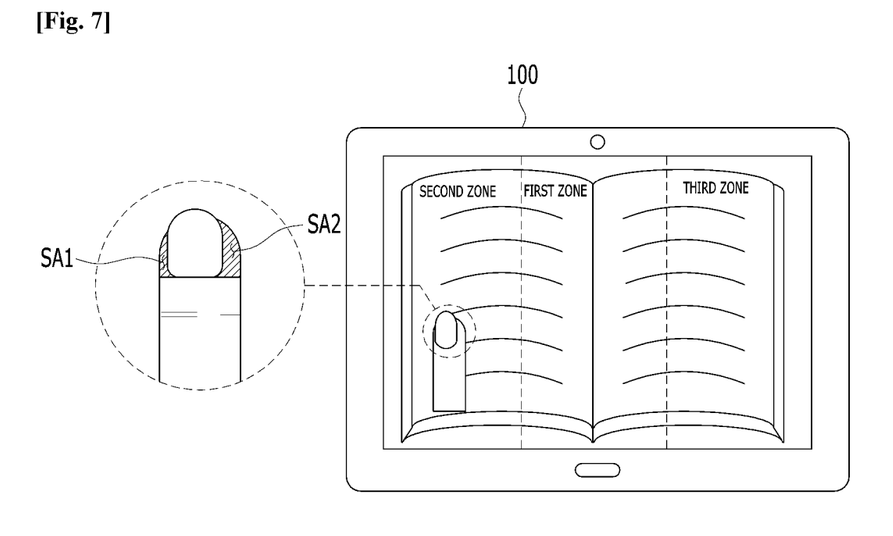

For another example, when the second zone is detected on the basis of the finger location as illustrated in FIG. 7, the input detection module 170 detects the first area SA1 indicating the area of skin located on the left of the nail in the finger on the target surface image TI and the second area SA2 indicating the area of skin located on the right of the nail in the finger on the target surface image TI. The input detection module 170 compares the first area SA1 and the second area SA2. When the second area SA2 is larger than the first area SA1, the input detection module 170 detects this condition as a touch input.

Figure 8:
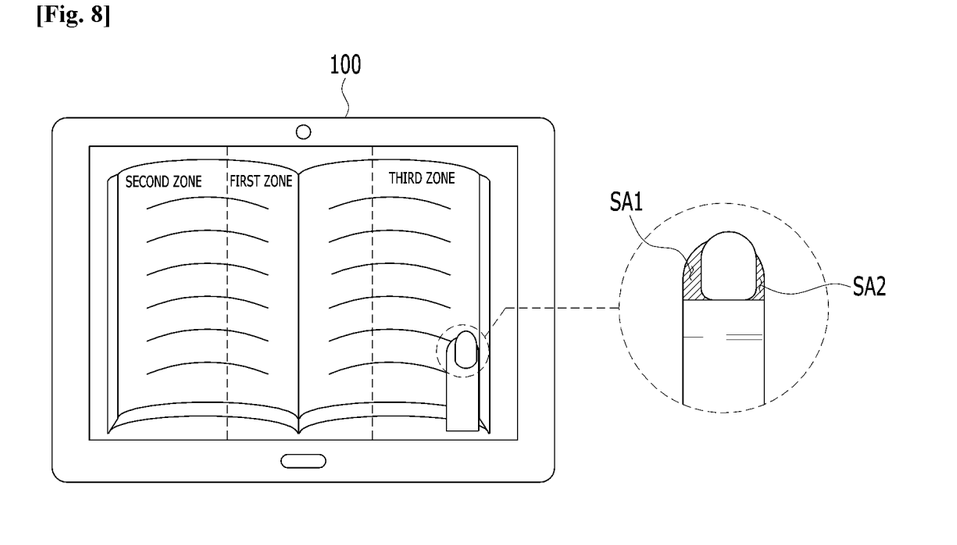

For another example, when the third zone is detected on the basis of the finger location as illustrated in FIG. 8, the input detection module 170 detects the first area SA1 indicating the area of skin located on the left of the nail and the second area SA2 indicating the area of skin located on the right of the nail, in the finger on the target surface image TI. The input detection module 170 compares the first area SA1 and the second area SA2. When the second area SA2 is larger than the first area SA1, the input detection module 170 detects this condition as a touch input.

When the location of the finger on the target surface image TI is changed immediately after the touch input is detected, the input detection module 170 detects the change as a drag input. That is, the input detection module 170 tracks the finger on the target surface image TI. When the location of the finger is changed immediately after the location of the finger was not moved for the preset time such that this condition was detected as the touch input, the input detection module 170 detects the change as a drag input. In other words, when the location of the finger on the target surface image TI is changed after the location of the finger was fixed for the preset time or more, the input detection module 170 detects the change as a drag input.

Figure 9:
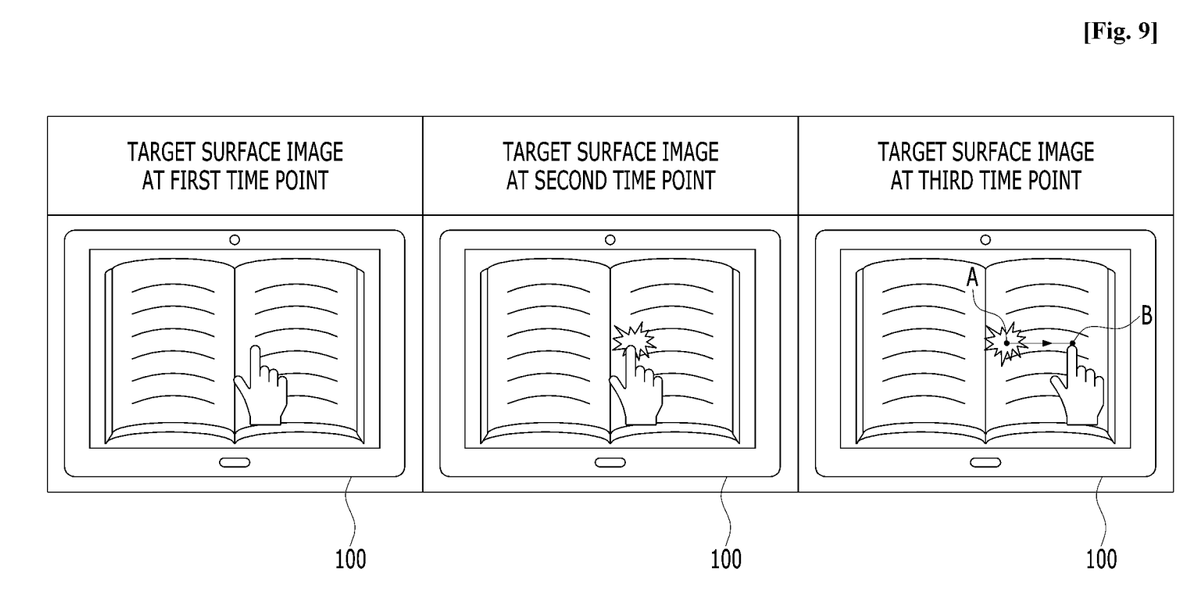
FIG. 9 is a diagram for describing an example in which the input detection module of FIG. 2 detects a drag input.

For example, referring to FIG. 9, when the location of the finger on the target surface image TI is changed (moved) at a third time point T3 after being maintained during the time period from the first time point T1 to the second time point T2, the input detection module 170 detects the change as a drag input. The second time point T2 indicates the point of time that the preset time has elapsed from the first time point T1, and the third time point T3 indicates the point of time that a time shorter than the preset time has elapsed from the second time point T2.

Through the operation, the reading support apparatus 100 may detect a user input while capturing and outputting an image of the target surface image TI including the real book 10 through one camera 110, and perform an action corresponding to the user input.

Hereafter, a user input detection method using the reading support apparatus 100 in accordance with an embodiment of the present disclosure will be described in detail with reference to the accompanying drawings.

Figure 10:
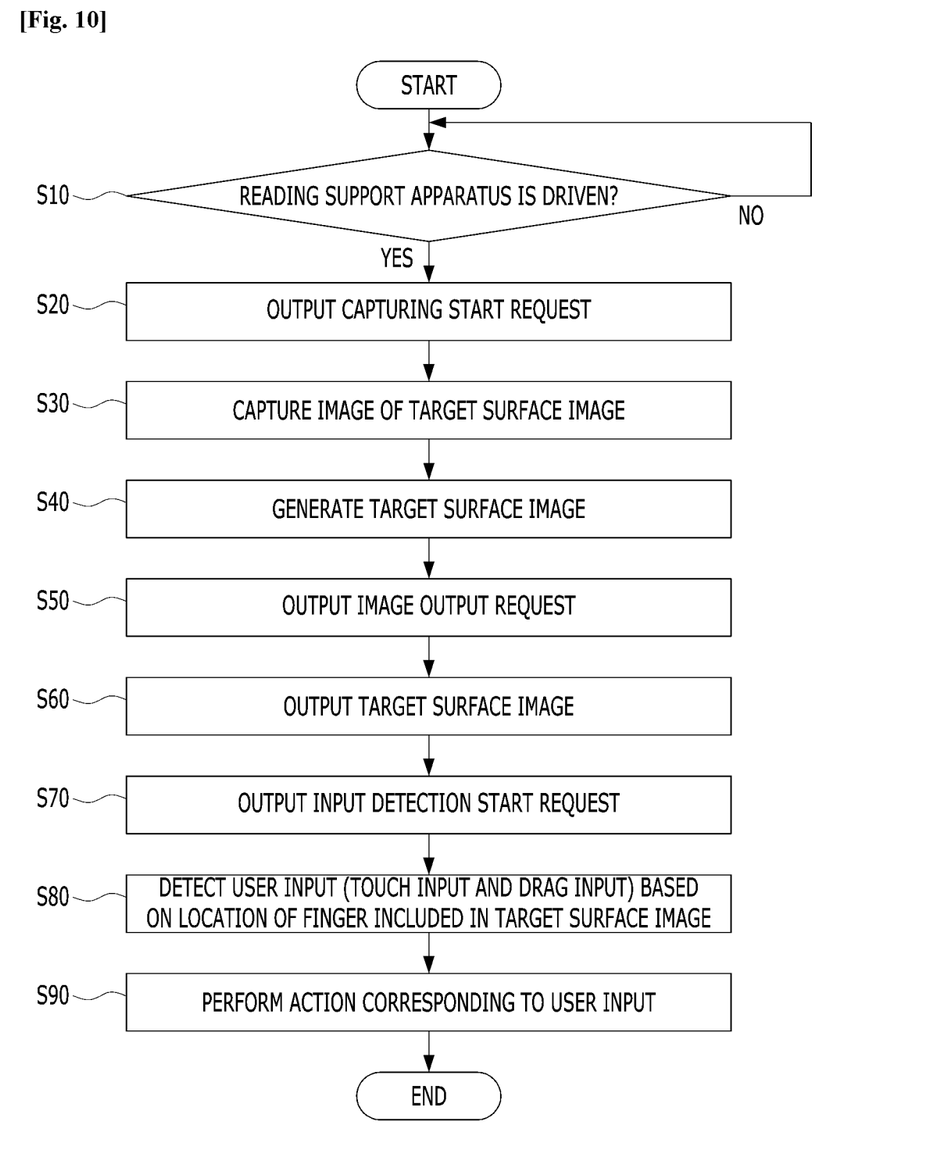
FIG. 10 is a flowchart for describing a user input detection method using a reading support apparatus in accordance with an embodiment of the present disclosure.

Referring to FIG. 10, when the reading support apparatus 100 is driven by a user (Yes in step S10), the control module 150 outputs a capturing start request in step S20. At this time, the control module 150 outputs the capturing start request to the camera 110 and the image processing module 130.

The camera 110 captures an image of a target surface (i.e. an area where the real book 10 is disposed) in response to the capturing start request of the control module 150, in step S30. The camera 110 is disposed obliquely above the target surface so as to capture an image of the target surface, and transmits the captured image to the image processing module 130.

The image processing module 130 generates the target surface image TI in response to the capturing start request of the control module 150, in step S40. The image processing module 130 processes the image received from the camera 110 into the target surface image TI, and transmits the target surface image TI to the control module 150. The target surface image TI indicates an image obtained by photographing a surface of the real book 10 or the surface on which the real book 10 is disposed.

The control module 150 having received the target surface image TI from the image processing module 130 outputs an image output request in step S50. The control module 150 generates the image output request including the target surface image TI received from the image processing module 130, and transmits the image output request to the display 190.

The display 190 outputs the target surface image TI onto the screen in response to the image output request, in step S60. At this time, the display 190 outputs the target surface image TI including the real book 10 onto the screen.

The control module 150 sets the reading support apparatus 100 to an input detection mode after transmitting the capturing start request, and outputs the input detection start request as the reading support apparatus 100 is set to the input detection mode, in step S70. At this time, the control module 150 transmits the input detection start request to the input detection module 170.

The input detection module 170 detects a user input on the basis of the location of the finger included in the target surface image TI in response to the input detection start request, in step S80. The input detection module 170 detects a touch input and drag input as a user input on the basis of whether the location of the finger is changed.

The control module 150 performs an action corresponding to the user input detected by the input detection module 170, in step S90.

In step S80, the input detection module 170 detects the user input (touch input and drag input) on the basis of the location of the finger included in the target surface image TI. That is, when the location of the finger on the target surface image TI is not moved for a preset time or when the state in which the location of the finger is at a standstill is maintained, the input detection module 170 detects this condition as the touch input. When the location of the finger is moved after the touch input is detected, the input detection module 170 cancels the touch input detection, and detects the movement as a drag input.

Figure 11:
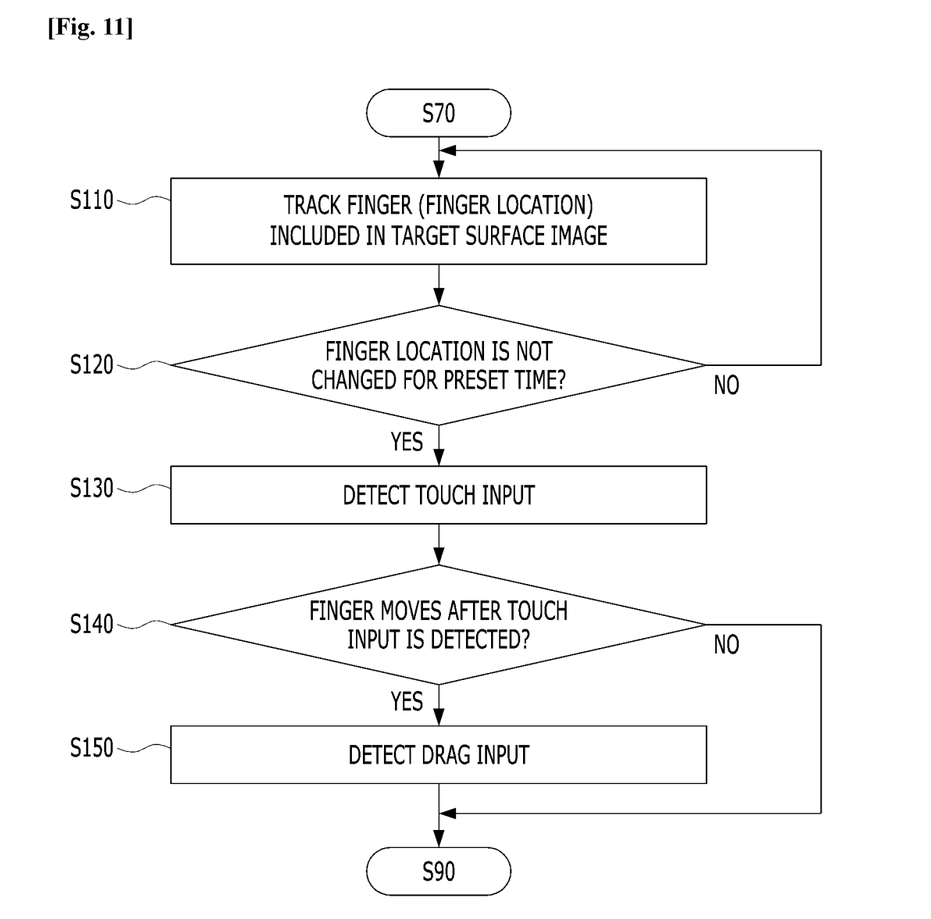
FIG. 11 is a flowchart for describing an example of a touch input detection step of FIG. 10.

Referring to FIG. 11, the input detection module 170 tracks the location of the finger by analyzing the target surface image TI, in step S110. At this time, the input detection module 170 start tracking the finger, when the finger is located in an area where a text and/or image is disposed in the entire area of the target surface image TI. That is, since the reading support apparatus 100 performs an action such as video playback or vocabulary dictionary output, related to a text or image of the real book 10, the input detection module 170 tracks the finger in the area where the text and/or image is disposed in the entire area of the target surface image TI.

When the location of the finger is not changed within the target surface image TI for a preset time (Yes in step S120), the input detection module 170 detects this condition as a touch input in step S130. That is, when the location of the finger on the target surface image TI is not changed during a time period from a first time point T1 to a second time point T2, the input detection module 170 detects this condition as the touch input. At this time, the second time point T2 corresponds to the point of time that the preset time has elapsed from the first time point T1.

When the location of the finger on the target surface image TI is changed (Yes in step S140) immediately after the touch input was detected in step S130, the input detection module 170 cancels the touch input, and detects the change as the drag input, in step S150. That is, when the location of the finger is changed immediately after the location of the finger was not moved for the preset time such that this condition was detected as the touch input, the input detection module 170 detects the change as the drag input. In other words, when the location of the finger on the target surface image TI is changed after being fixed for the preset time or more, the input detection module 170 detects the change as the drag input.

When the input detection module 170 detects a touch input only with a change in location of the finger, a user's action of putting a finger on the target surface so as to turn a page or placing the finger on the target surface to perform another operation may be recognized as a touch. Since the target surface image TI is an image captured through one camera 110 disposed obliquely above the target surface, the area of skin on the left of the nail and the area of skin on the right of the nail may be equal to or different from each other, depending on the relative location of the finger (e.g. the location of the finger on the real book 10 or the location of the finger on the target surface image TI).

In step S130, the input detection module 170 may detect a touch input on the basis of the location of the finger included in the target surface image TI and the area of skin around the nail.

Figure 12:
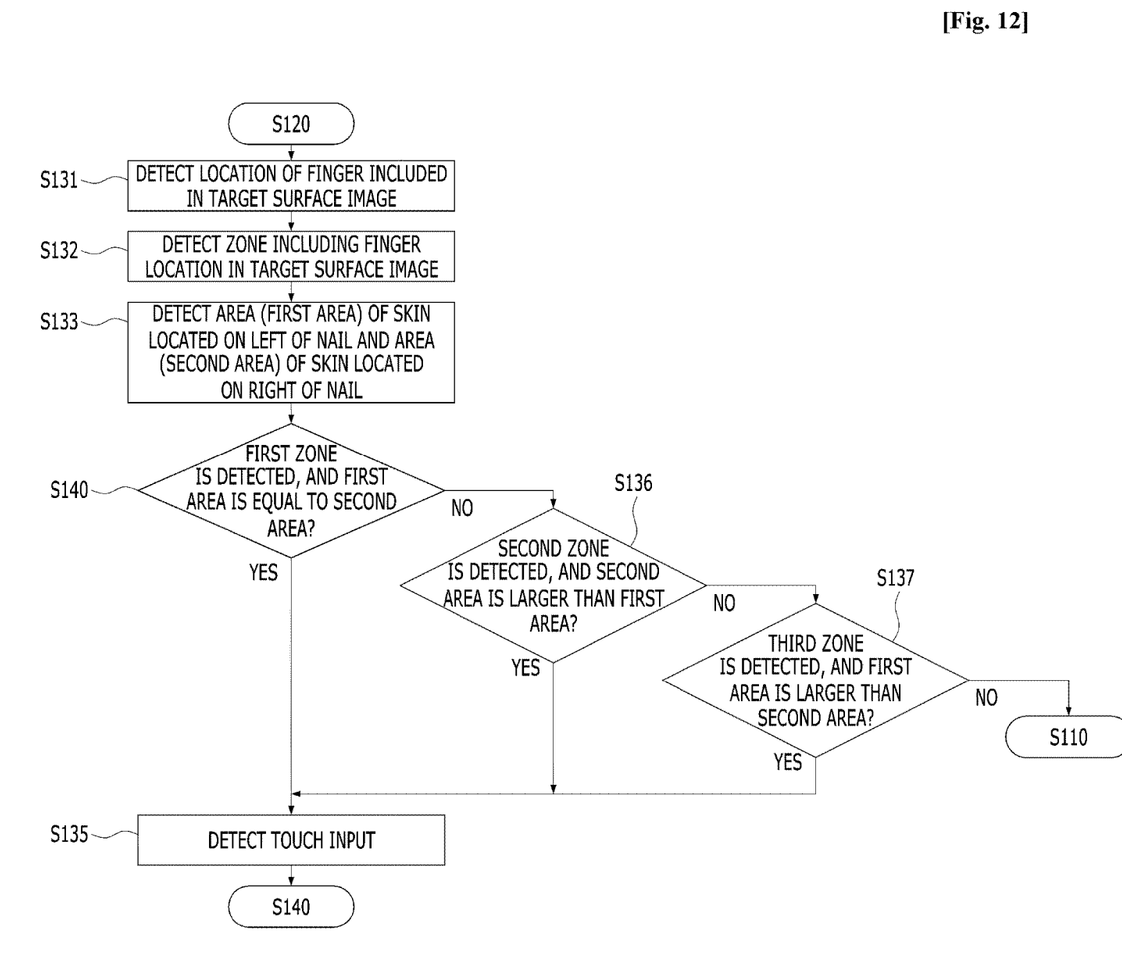
FIG. 12 is a flowchart for describing a modified example of the touch input detection step of FIG. 10.

Referring to FIG. 12, when the location of the finger within the target surface image TI is not changed for the preset time (Yes in step S120), the input detection module 170 detects the location of the finger included in the target surface image TI (i.e. the target surface image TI at the second time point T2) in step S131.

The input detection module 170 detects a zone including the finger location detected in step S131 from the entire area of the target surface image TI, in step S132. At this time, the input detection module 170 divides the target surface image TI into a first zone, a second zone disposed on the left of the first zone, and a third zone disposed on the right of the first zone, and detects one zone including the location of the finger.

The input detection module 170 detects a first area SA1 indicating the area of skin located on the left of the nail and a second area SA2 indicating the area of skin located on the right of the nail, in the finger on the target surface image TI, in step S133.

When the first zone is detected on the basis of the finger location and the first and second areas SA1 and SA2 are equal to each other within an error range (Yes in step S134), the input detection module 170 detects this condition as a touch input in step S135. That is, the camera 110 is disposed obliquely above the target surface, and captures an image of the target surface. Thus, when a touch occurs in the first zone corresponding to the central portion of the target surface image TI, the areas of skin on both sides of the nail on the captured image are almost equal to each other. Thus, when the first and second areas SA1 and SA2 are equal to each other within the error range in case that the first zone is detected, the input detection module 170 detects this condition as the touch input.

When the second zone is detected on the basis of the finger location and the second area SA2 is larger than the first area SA1 (Yes in step S136), the input detection module 170 detects this condition as the touch input in step S135. When a touch occurs in the second zone corresponding to the left portion of the target surface image TI, the area of skin on the right of the nail on the captured image becomes larger than the area of skin located on the left of the nail on the captured image. Thus, when the second area SA2 is larger than the first area SA1 in case that the second zone is detected, the input detection module 170 detects this condition as the touch input.

When the third zone is detected on the basis of the finger location and the second area SA2 is smaller than the first area SA1 (Yes in step S137), the input detection module 170 detects this condition as the touch input in step S135. When a touch occurs in the third zone corresponding to the right portion of the target surface image TI, the area of skin on the left of the nail on the captured image becomes larger than the area of skin on the right of the nail on the capture image. Thus, when the first area SA1 is larger than the second area SA2 in case that the third zone is detected, the input detection module 170 detects this condition as the touch input.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. A reading support apparatus comprising:
a memory configured to store instructions which, when executed, cause the reader terminal to perform operations;
a processor configured to generate and output a capturing start request for staring a service, generate and output an image output request including a target surface image when the target surface image is inputted as a response to the capturing start request; and
a display configured to output the target surface image generated in response to the image output request,
wherein the processor further configured to:
set the reading support apparatus to an input detection mode after outputting the image output request, and then generate and output an input detection start request,
process an image, captured through one camera which captures an image of an area in which a real book is disposed in response to the capturing start request, into the target surface image, and
detect a finger as a detection target from the target surface image in response to the input detection start request, and determine that a user touch is inputted, when the location of the detection target is not changed for a preset time,
wherein the processor divides the target surface image into a plurality of zones, and detects a touch input by detecting a zone including the location of the detection target and comparing the area of skin on the left of a nail of the finger to the area of skin on the right of the nail, when the location of the detection target is not changed for a preset time.

2. The reading support apparatus of claim 1, wherein the processor generates, as the target surface image, an image inputted from the one camera disposed obliquely above the area in which the real book is disposed.

3. The reading support apparatus of claim 1, wherein the processor detects, as a detection target, a finger located in an area where at least one of a text and image is disposed in the entire area of the target surface image.

4. The reading support apparatus of claim 1, wherein when the location of the detection target on the target surface image is changed after the touch input is detected, the processor detects the change as a drag input.

5. The reading support apparatus of claim 1, wherein the processor divides the target surface image into a first zone, a second zone disposed on the left of the first zone, and a third zone disposed on the right of the first zone, wherein when the detection target is detected in the first zone and the area of skin on the left is equal to the area of skin on the right, the processor detects this condition as a touch input.

6. The reading support apparatus of claim 1, wherein the processor divides the target surface image into a first zone, a second zone disposed on the left of the first zone, and a third zone disposed on the right of the first zone, wherein when the detection target is detected in the second zone and the area of skin on the right is larger than the area of skin on the left, the processor detects this condition as a touch input.

7. The reading support apparatus of claim 1, wherein the processor divides the target surface image into a first zone, a second zone disposed on the left of the first zone, and a third zone disposed on the right of the first zone, wherein when the detection target is detected in the third zone and the area of skin on the left is larger than the area of skin on the right, the processor detects this condition as a touch input.

8. A user input detection method using a reading support apparatus, comprising:
  outputting a capturing start request for starting a service;
  processing an image captured through one camera, which captures an image of the area where a real book is disposed in response to the capturing start request, into a target surface image;
  outputting an image output request including the target surface image;
  outputting the target surface image in response to the image output request;
  outputting an input detection start request to detect a user input, after outputting the image output request; and
  detecting a finger included in the target surface image as a detection target in response to the input detection start request, and detecting, as a touch input, a condition in which the location of the detection target is not changed for a preset time
  wherein the target surface image is divided into a plurality of zones,
  wherein the detecting of the condition as the touch input comprises detecting a touch input by detecting a zone including the location of the detection target and comparing the area of skin on the left of a nail of the finger to the area of skin on the right of the nail, when the location of the detection target is not changed for a preset time.

9. The user input detection method of claim 8, wherein the detecting of the condition as the touch input comprises detecting, as a detection target, a finger located in an area where at least one of a text and image is disposed in the entire area of the target surface image.

10. The user input detection method of claim 8, further comprising, when the location of the detection target on the target surface image is changed after the touch input is detected after the detecting of the condition as the touch input, detecting the change as a drag input.

11. The user input detection method of claim 8, wherein the target surface image is divided into a first zone, a second zone disposed on the left of the first zone, and a third zone disposed on the right of the first zone,
  wherein the detecting of the condition as the touch input comprises detecting, as a touch input, a condition in which the detection target is detected in the first zone and the area of skin on the left of the nail in the detection target is equal to the area of skin on the right of the nail.

12. The user input detection method of claim 8, wherein the target surface image is divided into a first zone, a second zone disposed on the left of the first zone, and a third zone disposed on the right of the first zone,
  wherein the detecting of the condition as the touch input comprises detecting, as a touch input, a condition in which the detection target is detected in the second zone and the area of skin on the right of the nail in the detection target is larger than the area of skin on the left of the nail.

13. The user input detection method of claim 8, wherein the target surface image is divided into a first zone, a second zone disposed on the left of the first zone, and a third zone disposed on the right of the first zone,
  wherein the detecting of the condition as the touch input comprises detecting, as a touch input, a condition in which the detection target is detected in the third zone, and the detection target is detected in the third zone and the area of skin on the left of the nail in the detection target is larger than the area of skin on the right of the nail.

\* \* \* \* \*